United States Patent
Kan (10) Patent No.: US 12,519,663 B2
(45) Date of Patent: Jan. 6, 2026

(54) SYNERGISTIC PHYSICAL UNCLONABLE FUNCTION (PUF) USING MEMORY REPAIR DATA AND RING OSCILLATORS

(71) Applicant: Cypress Semiconductor Corporation, San Jose, CA (US)

(72) Inventor: Senwen Kan, Austin, TX (US)

(73) Assignee: Cypress Semiconductor Corporation, San Jose, CA (US)

( * ) Notice: Subject to any disclaimer, the term of this patent is extended or adjusted under 35 U.S.C. 154(b) by 34 days.

(21) Appl. No.: 18/757,201

(22) Filed: Jun. 27, 2024

(65) Prior Publication Data
US 2026/0005875 A1     Jan. 1, 2026

(51) Int. Cl.
*H04L 9/32* (2006.01)

(52) U.S. Cl.
CPC .................................. *H04L 9/3278* (2013.01)

(58) Field of Classification Search
CPC ...................................................... H04L 9/3278
See application file for complete search history.

(56) References Cited

U.S. PATENT DOCUMENTS

| | | | | |
|---|---|---|---|---|
| 9,444,618 B1* | 9/2016 | Trimberger | ............ | H04L 9/3278 |
| 10,320,569 B1* | 6/2019 | Wentz | .................... | H04L 9/3239 |
| 10,469,273 B2* | 11/2019 | Afghah | ................. | H04L 9/3278 |
| 10,915,635 B2* | 2/2021 | Hars | ...................... | G06F 21/575 |
| 12,255,651 B1* | 3/2025 | Cheng | .................. | H03K 3/0315 |
| 2013/0019324 A1* | 1/2013 | Tehranipoor | ......... | H03K 3/0315 726/34 |
| 2014/0372671 A1* | 12/2014 | Tanamoto | ............... | G06F 21/73 711/163 |
| 2015/0269378 A1* | 9/2015 | Falk | ...................... | H04L 63/105 726/6 |
| 2016/0364582 A1* | 12/2016 | Cammarota | ............ | H04L 9/008 |
| 2016/0364583 A1* | 12/2016 | Benoit | .................. | H04L 9/3278 |
| 2018/0210839 A1* | 7/2018 | Bacha | .................. | H04L 9/0866 |
| 2020/0162249 A1* | 5/2020 | Lee | ..................... | H03K 19/0963 |
| 2021/0312057 A1* | 10/2021 | Kloth | .................... | G06F 21/575 |
| 2022/0029836 A1* | 1/2022 | Qureshi | ................ | H04L 9/0643 |
| 2023/0091028 A1* | 3/2023 | Norrod | ................. | H04L 9/3263 713/189 |
| 2023/0171114 A1* | 6/2023 | Lea | ....................... | H04L 9/3278 713/189 |
| 2023/0283487 A1* | 9/2023 | Angelo | ................. | H04L 9/3278 713/168 |

(Continued)

*Primary Examiner* — Gary S Gracia (57) ABSTRACT

A physical unclonable function (PUF) device is disclosed. The PUF device includes ring oscillators. Each ring oscillator generates an oscillating signal based on an input challenge. The PUF device further includes counters. Each counter counts a number of oscillations in an oscillating signal generated by a corresponding ring oscillator, and produce a counter value representing the counted number of oscillations. The PUF device further includes comparators. Each comparator compares a counter value with a median counter value, and produce a resulting value. The PUF device further includes a response generator that generates a first response based on the resulting values. The first response includes an address used to index into a memory device to read PUF data and memory repair data from the memory device. The PUF device further includes a PUF output generator that generates a second response based on the PUF data and the memory repair data.

20 Claims, 5 Drawing Sheets

(56) References Cited

U.S. PATENT DOCUMENTS

| | | | |
|---|---|---|---|
| 2023/0327891 A1* | 10/2023 | Duval | H04L 9/3278 |
| | | | 713/189 |
| 2023/0344624 A1* | 10/2023 | Sarkar | H04L 9/0894 |
| 2024/0187222 A1* | 6/2024 | Lindskog | H04L 9/0866 |
| 2024/0413099 A1* | 12/2024 | Wesselkamper | H01L 23/573 |

* cited by examiner

SYNERGISTIC PHYSICAL UNCLONABLE FUNCTION (PUF) USING MEMORY REPAIR DATA AND RING OSCILLATORS

FIELD OF THE INVENTION

Embodiments of the present disclosure relate generally to security technology. More specifically, embodiments of the present disclosure relate to physical unclonable function (PUF) technology using memory repair data and ring oscillators.

BACKGROUND

A physical unclonable function (sometimes also called physically unclonable function), or PUF, is a device or structure which operation cannot be reproduced (cloned) in a physical way, for example, by making another system using the same technology. In a PUF, for a given input and conditions (challenge), the PUF provides a physically defined digital fingerprint output (response) that serves as a unique identifier, for example, for a semiconductor device such as a microprocessor. PUFs can be implemented in integrated circuits, including field programmable gate arrays (FPGAs), and can be used in applications with high-security requirements, such as cryptography, Internet of Things (IoT) devices and privacy protection.

While a variety of PUFs have been proposed and provided by academia and intellectual property (IP) solution companies, there are still a number of problems with existing PUFs. First, the existing PUFs have PUF response instability across all temperature ranges and process corners. In other words, the PUFs may not produce robust and consistent results, which is not desirable. Second, existing PUF technologies can be reverse engineered using machine learning (ML) algorithms, thereby compromising the PUFs. Third, the existing PUFs are susceptible to alternative attack vectors (side channels).

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

According to one aspect, a physical unclonable function (PUF) device is provided. The PUF device may include a plurality of ring oscillators, where each ring oscillator may be configured to generate an oscillating signal based on an input challenge. The PUF device may further include a plurality of counters, where each counter may be configured to count a number of oscillations in an oscillating signal generated by a corresponding ring oscillator among the plurality of ring oscillators, and produce a counter value representing the counted number of oscillations. The PUF device may further include a plurality of comparators, where each comparator may be configured to compare a counter value produced by a corresponding counter among the plurality of counters with a median counter value and produce a resulting value. The PUF device may further include a response generator configured to generate a first response based on the resulting values produced by the plurality of comparators. The first response may include an address used to index into a memory device to read PUF data from a memory PUF region of the memory device and memory repair data from a memory repair data region of the memory device. The PUF device may further include a PUF output generator configured to generate a second response based on the read PUF data and the read memory repair data.

According to another aspect, a method for a PUF device is provided. The method may include generating a plurality of oscillating signals based on an input challenge. The method may further include counting a number of oscillations in each oscillating signal among the plurality of oscillating signals, and producing a plurality of counter values respectively representing the counted numbers of oscillations in the plurality of oscillating signals. The method may further include comparing each counter value among the plurality of counter values with a median counter value, to produce a plurality of resulting values. The method may further include generating a first response based on the plurality of resulting values. The first response may include an address used to index into a memory device to read PUF data from a memory PUF region of the memory device and memory repair data from a memory repair data region of the memory device. The method may further include generating a second response based on the read PUF data and the read memory repair data.

Figure 1:
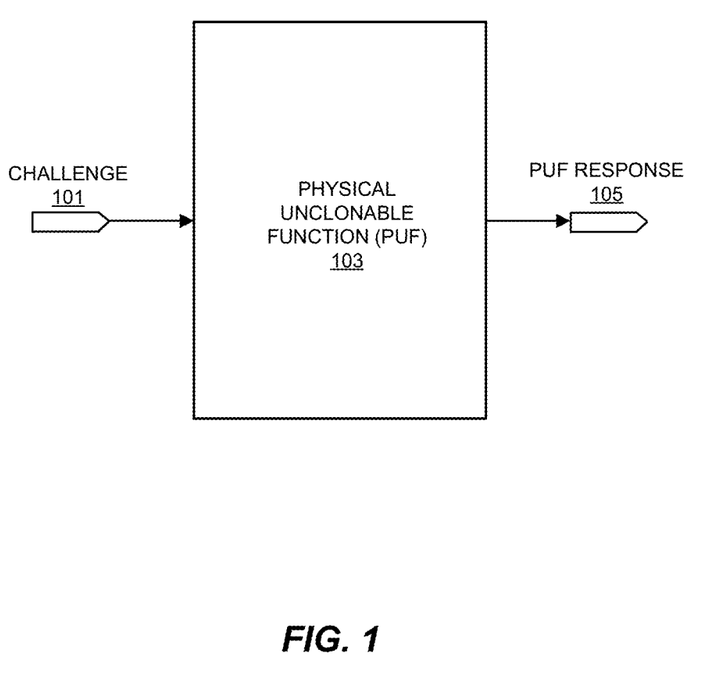
FIG. 1 is a block diagram illustrating a physical unclonable function (PUF) system according to an embodiment.

FIG. 1 is a block diagram illustrating a PUF system according to an embodiment. Referring to FIG. 1, PUF system 100 includes a PUF device or structure 103 that accepts a challenge 101 (e.g., variable of n-bits length) and produces a PUF response 105, which may be of m-bits length, where m and n are integers greater than zero (0). The PUF device 103 may include two stages in performing PUF operations. The first stage may include generation of a response, for example, a physically unclonable code word with error correction and calibration based on the given PUF challenge 101. In the second stage, the generated response from the first stage may be error corrected and used to index into a memory PUF region (e.g., static random access memory (SRAM) PUF region) with triple modular redundancy (TMR) encoding and memory repair data (e.g., SRAM repair data), to produce a TMR-FEC (forward error correction) result that may represent PUF response 105.

Figure 2:
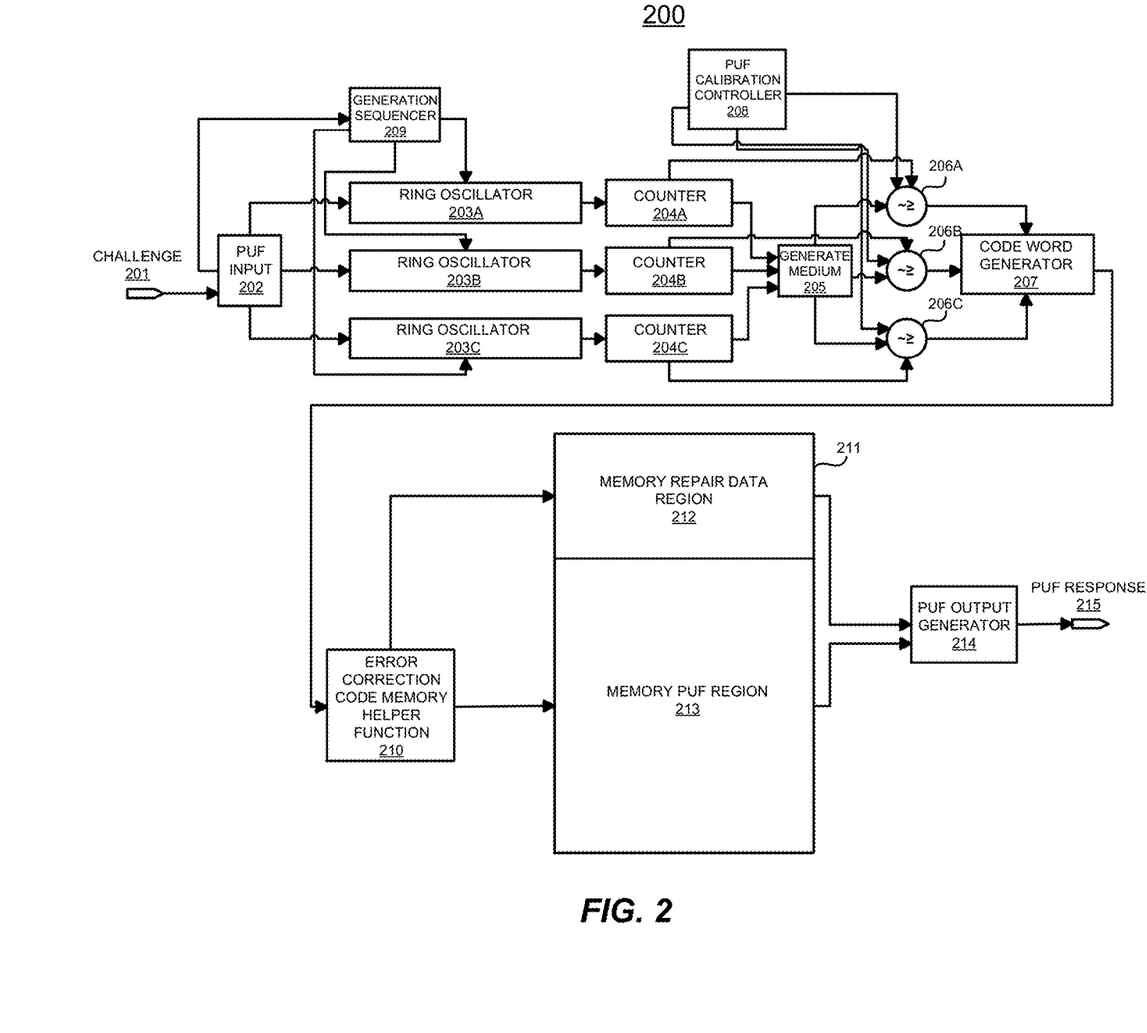
FIG. 2 is a block diagram illustrating an example PUF device or structure according to an embodiment.

FIG. 2 is a block diagram illustrating an example PUF device or structure according to an embodiment. In some embodiments, PUF device 200 may be implemented using hardware (e.g. circuitry, dedicated logic, etc.), software (e.g., embodied on a non-transitory computer readable medium), or a combination of both. In an embodiment, PUF device 200 may be the PUF device 103 of FIG. 1.

Referring to FIG. 2, PUF device 200 may include, but not limited to, a PUF input 202, ring oscillators 203A-C, counters 204A-C, a generate medium 205, comparators 206A-C, a code word generator 207, a PUF calibration controller or factor unit 208, a generation sequencer 209, an error correction code memory helper function 210, a memory or storage device 211 (e.g., SRAM), and a PUF output generator 214.

In an embodiment, PUF input 202 may accept or receive a challenge 201, and decode the challenge 201 (input) into ring oscillator staging selection and sampling period. Challenge 201 may be a variable or binary value of n-bits length, where n is an integer greater than 0. As shown, PUF input 202 may provide the decoded input (challenge) to each of the ring oscillators 203A-C and generation sequencer 209. Ring oscillators 203A-C may be symmetric ring oscillators that are physically symmetric to one another and can be configured based on the ring oscillator stages selected. Each of the ring oscillators 203A-C may include a number of inverters and buffers (e.g., three or more inverters) configured in a ring. It is noted that while three ring oscillators are shown in FIG. 2, any number of ring oscillators (e.g., five, seven, etc.) may be implemented in PUF device 200.

In an embodiment, generation sequencer 209 may control operations leading to the generation of code word from code word generator 207, which comprise the first stage of the PUF device 200. In response to the decoded input (challenge) from PUF input 202, generation sequencer 209 may change or transition from one stage (or state) to another stage. Generation sequence 209 may produce a generation sequencer output indicating the current stage it is in. In some embodiments, generation sequence 209 may be a deterministic or non-deterministic finite state machine (FSM).

Based on the decoded input and the generation sequencer output (current ring oscillator stage), each ring oscillator can produce a signal having a number of oscillations at an oscillation frequency. For example, the output of the ring oscillator may oscillate between two voltage levels, representing TRUE and FALSE. In an embodiment, counters 204A-C (e.g., synchronous or asynchronous counters) may respectively count and store the number of oscillations produced by ring oscillators 203A-C for a given time period, and respectively provide the counter values (number of oscillations) to comparators 206A-C and generate medium 205. Based on the provided counter values from counters 204A-C, generate medium 205 may select a center (or median) counter value from the counter values and provide the center counter value to each of the comparators 206A-C.

Each of the comparators 206A-C may compare the respective counter value (number of oscillations) to the center counter value and produce a resulting value, which may be a binary value. For example, if the counter value is greater than or equal to the center counter value, the comparator may output a TRUE value ("1") or vice versa. Otherwise, if the counter value is less than the center counter value, the comparator may output a FALSE value ("0") or vice versa. In an embodiment, PUF calibration controller 208 may also provide a calibration signal to each comparator to generate a calibration scheme for the counter value with respect to the center counter value. For example, PUF calibration controller 208 can take a one time programmable (OTP) selected operation, such as a square root or division of the center counter value or calculate a standard deviation from the center counter value, and perform an addition or subtraction operation of that value to each counter value.

Based on the respective resulting values from comparators 206A-C, code word generator 207 may generate a response (also referred to as first stage response), for example, a distinct address value that can be manipulated to form an index value. The response may be provided to an error correction code memory helper function 210 that may perform a parity check and error correction to generate an address that can be indexed into memory device 211. The error correction may be performed using an error correction code technique or method, such as cyclic redundancy check (CRC), error correction code (ECC), etc.

In an embodiment, the address may be indexed into a memory PUF region 213 (e.g., SRAM PUF region) of memory device 211, which may be an uninitialized memory region having random powered up state values, to read data at a specific memory location within memory PUF region 213. The read data addressed by the address may be provided to PUF output generator 214. In some embodiments, a voting mechanism or process (e.g., triple modular redundancy (TMR) voting mechanism) may be performed on (or interpret) the read data to produce a voted output value that is provided to PUF output generator 214. For example, the voting process may take a certain number of bits (e.g., 3 bits) from the read data and vote on those bits to produce one or more output bits. The table below shows some examples of the voting process described herein.

| INPUT | OUTPUT |
| --- | --- |
| 1 0 1 | 1 |
| 1 1 0 | 1 |
| 1 0 0 | 0 |
| {100, 110} | {01} |

In the 3-bit examples shown in the table above, if the majority of the input bits (e.g., two or more of the input bits) are 1, the majority-voted output bit is 1. Conversely, if the majority of the input bits are 0, the majority-voted output bit is 0. In some embodiments, upon a power up by memory device 211, the memory PUF region 213 can be refreshed such that all the corresponding entries, interpreted from the voting process as 1 or 0, receive input data set as 111 or 000. In this way, the reliability benefits from the voting process (e.g., TMR process) can be exploited.

In an embodiment, the address may also be index into memory repair data region 212 of memory device 211 (e.g., SRAM repair data) to read specific repair data indexed by the address, and the read repair data may be provided to PUF output generator 214. In some embodiments, the memory repair data region 212 may include memory repair reconfiguration data that may exist for parts or sectors of memory device 211 that require repair.

In an embodiment, PUF output generator 214 may concatenate, perform a finite field calculation, e.g., GF(2), on, or CRC multiply the voted output from memory PUF region 213 and the read repair data from memory repair data region 212, to produce PUF response 215.

Figure 3A:
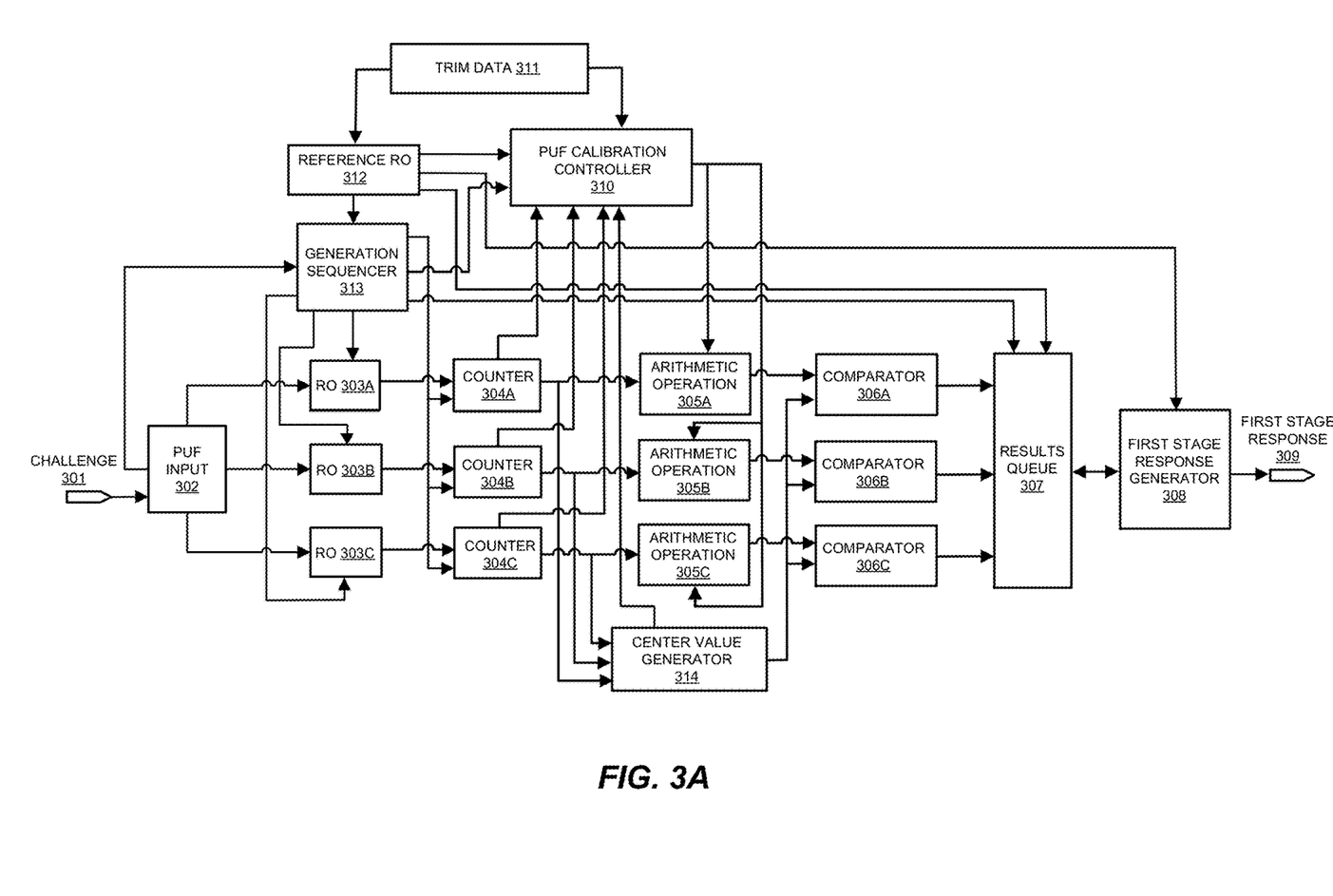
FIG. 3A is a block diagram illustrating a first stage architecture of a PUF device or structure according to an embodiment.

FIG. 3A is a block diagram illustrating a first stage architecture of a PUF device or structure according to an embodiment. First stage architecture 300A may be implemented using hardware (e.g. circuitry, dedicated logic, etc.), software (e.g., embodied on a non-transitory computer readable medium), or a combination of both.

Referring to FIG. 3A, first stage architecture 300A of the PUF device (e.g., PUF device 103 of FIG. 1) may include, but not limited to, a PUF input 302, ring oscillators 303A-C, counters 304A-C, arithmetic operations 305A-C, comparators 306A-C, a results queue 307, a first stage response generator 308, a PUF calibration control factor unit 310, a reference ring oscillator 312, a generation sequencer 313, and a center value generator 314.

In an embodiment, PUF input 302 may accept a challenge 301, and decode the challenge 301 into ring oscillator staging selection and sampling period. Challenge 301 may be a binary value of n-bits length, where n is an integer greater than 0. As shown, PUF input 302 may provide the decoded challenge (input) to each of the ring oscillators 303A-C and generation sequencer 313. Ring oscillators 303A-C may be symmetric ring oscillators that are physically symmetric to one another and can be configured based on selected ring oscillator stages. Each of the ring oscillators 303A-C may include inverters and buffers (e.g., three or more inverters) configured in a ring configuration. It is noted that while three ring oscillators are shown in FIG. 3A, any number of ring oscillators (e.g., five, seven, etc.) may be implemented in architecture 300A.

In an embodiment, generation sequencer 313 may control operations of the first stage of the PUF device. In response to the decoded challenge from PUF input 302 and an oscillating signal (or signal having oscillations) produced by reference ring oscillator 312, generation sequencer 313 may change or transition from one stage (or state) to another stage. Generation sequencer 313 may produce a generation sequencer output indicating the current stage it is in. For example, generation sequencer 313 may interpret the decoded challenge from PUF input 302 and sequence the modules or blocks in first stage architecture 300A through a series of epochs to generate first stage response 309. For each epoch, generation sequencer 313 may clear/reset counters 304A-C and stop/disable the rings oscillators 303A-C. Generation sequencer 313 may allow the counters 304A-C to count, but it may also count on its own during the epoch by sourcing the reference ring oscillator 312 to control the duration of the epoch, and then start the ring oscillators 303A-C. On a derived challenge duration, generation sequencer 313 may stop the ring oscillators 303A-C then trigger the center value generator 314 to compute a middle (or median) or average value among the counter values from counters 304A-C. In some embodiments generation sequencer 313 may trigger the PUF calibration control factor unit 310 to generate a calibration scheme to moderate the counter values so that they can be close to one another. In some embodiments, generation sequencer 313 may be a deterministic or non-deterministic FSM.

In an embodiment, PUF calibration control factor unit 310 may generate a calibration scheme for the counter values from the counters 304A-C with respect to the center counter value provided by center value generator 314. PUF calibration control factor unit 310 can take an OTP selected operation, such as a square root or division of the center counter value or calculate a standard deviation from the center counter value, and perform an addition or subtraction operation of that value to each counter value. For example, PUF calibration control factor unit 310 may calculate a standard deviation amount from the counter values, and use the standard deviation (sigma) value to compensate, such as adding the sigma value to a counter value if the counter value is less than the center counter value, or subtracting the sigma value from the counter value if the counter value is greater than the center counter value.

The counter values may then be compensated by arithmetic operations 305A-C and compared against the center or median counter value to generate a binary value (e.g., "0" or "1") if the comparison is greater than or equal to the center counter value for each counter. The comparison results may be pushed into results queue 307, as described in more detail herein below.

Based on the decoded input and the generation sequencer output (current ring oscillator stage), each of the ring oscillators 303A-C can produce a number of oscillations at an oscillation frequency. For example, the output of the ring oscillator may oscillate between two voltage levels, representing TRUE and FALSE. In an embodiment, counters 304A-C (e.g., synchronous or asynchronous counters) may respectively count and store the number of oscillations produced by ring oscillators 303A-C for a given time period, and respectively provide the counter values to arithmetic operations 305A-C, center value generator 314, and PUF calibration control factor 310.

Based on the counter values from counters 304A-C, center value generator 314 may select a center (or median) counter value, or compute an average counter value, from the counter values and provide the center (or average) counter value to each of the comparators 306A-C and PUF calibration control factor unit 310.

Each of arithmetic operations 305A-C may perform an arithmetic operation to calibrate the respective counter value based on a calibration scheme (or signal) generated from PUF calibration control factor unit 310. The calibrated counter values from arithmetic operations 305A-C may be respectively provided to comparators 306A-C.

Each of the comparators 306A-C may compare the respective calibrated counter value (number of oscillations) to the center counter value and produce a resulting value, which may be a binary value. For example, if the counter value is greater than or equal to the center counter value, the comparator may output a TRUE value ("1"), or vice versa. Otherwise, if the counter value is less than the center counter value, the comparator may output a FALSE value ("0"), or vice versa.

In an embodiment, results queue 307 may queue or store the resulting values from comparators 306A-C for each epoch of stage of ring oscillator operation as dictated by generation sequencer 313 and reference ring oscillator 312. In an embodiment, reference ring oscillator 312 may provide an oscillating signal (or signal having oscillations) to generation sequencer 313, PUF calibration control factor unit 310 and first stage response generator 308 to clock or synchronize the operations of the PUF device. Trim data 311 (e.g., system level data) may be distributed from OTP memory to configure reference oscillator 312 and/or PUF calibration control factor unit 310.

When all the required epochs are complete (e.g., when results queue 307 is full), first stage response generator 308 may be triggered by reference ring oscillator 312 to generate a memory PUF read operation (e.g., SRAM PUF read operation) and dequeue contents in the results queue 307 to form first stage response 309. Response 309 may be a distinct address value that can be manipulated to form an index value, as described in more detail herein below. In some embodiments, response 309 may require ring oscillator configuration changes, thereby leading to distinct results.

Figure 3B:
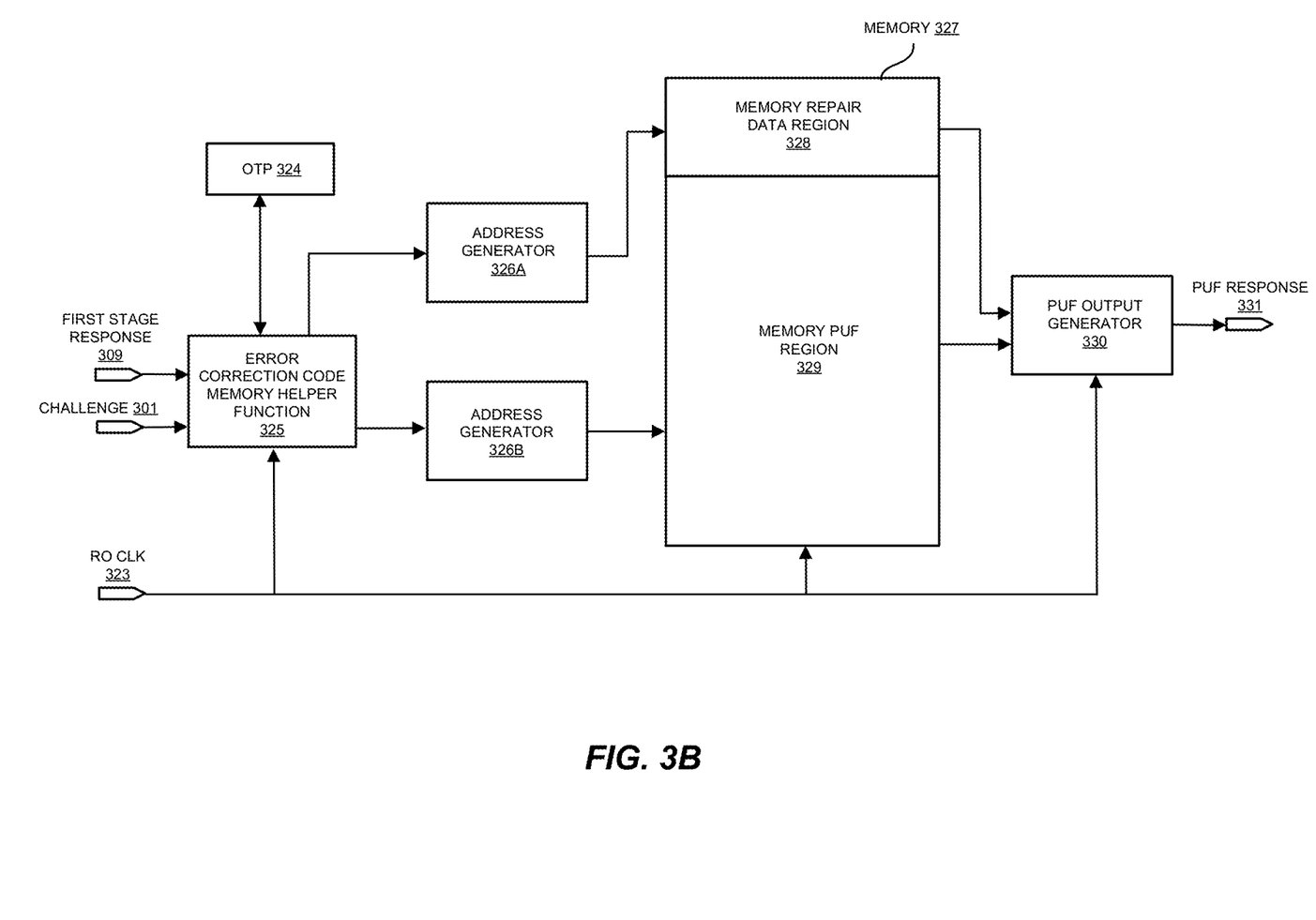
FIG. 3B is a block diagram illustrating a second stage architecture of the PUF device or structure according to an embodiment.

FIG. 3B is a block diagram illustrating a second stage architecture of the PUF device or structure according to an embodiment. Second stage architecture 300B may be implemented using hardware (e.g. circuitry, dedicated logic, etc.), software (e.g., embodied on a non-transitory computer readable medium), or a combination of both.

Referring to FIG. 3B, second stage architecture 300B may include, but not limited to, an error correction code memory helper function 325, address generators 326A-B, memory device 327 (e.g., SRAM), and PUF output generator 330.

In an embodiment, for each challenge 301, error correction code memory helper function 325 may store corresponding parity check data (e.g., a word) in OTP 324. The corresponding parity check data may be loaded into the OTP 324 during a chip power-up. When a read request is generated to form the first stage response 309 and the corresponding challenge 301 are received by function 325, function 325 may parity check and error correct the first stage response 309 to provide an address to address generators 326A-B. The error correction may be performed using various error code correction techniques, such as CRC, ECC, etc.

Address generators 326A-B may map the address generated from the first stage response 309 into addresses that can be respectively indexed into memory repair data region 328 (e.g., SRAM repair data region) and memory PUF region 329 (e.g., SRAM PUF region) of memory device 327. In an embodiment, the mapping can be performed using a hash function, a modulo reduction, or a secure hash function.

In an embodiment, the address from address generator 326B may be used to index into memory PUF region 329 to read or obtain data at a specific memory location within memory PUF region 329. The read data addressed by the address may be provided to PUF output generator 330. In an embodiment, the memory PUF region 329 may include an addressable memory PUF range that can also span a full chip memory repair region (e.g., repair data region 328). In an embodiment, the final value accessed from the memory PUF region 329 may be considered to be the PUF response 331.

Memory PUF region 329 may include an uninitialized memory region having random powered up state values. In some embodiments, a voting mechanism or process may be performed on (or interpret) the read data to produce a voted output value that is provided to PUF output generator 330. Aspects of the voting process have been previously described, and for brevity sake, will not be described again herein.

In an embodiment, the address from address generator 326A may be used to index into memory repair data region 328 to read or obtain specific repair data, which may be provided to PUF output generator 330. In some embodiments, the memory repair data region 328 may include memory repair reconfiguration data that may exist for parts or sectors of memory device 327 and additional on chip memory devices that require repair.

In an embodiment, PUF output generator 330 may concatenate, perform a finite field calculation, e.g., GF(2), on, or CRC multiply the voted output from memory PUF region 329 and the read repair data from memory repair data region 328, to produce PUF response 331.

Figure 4:
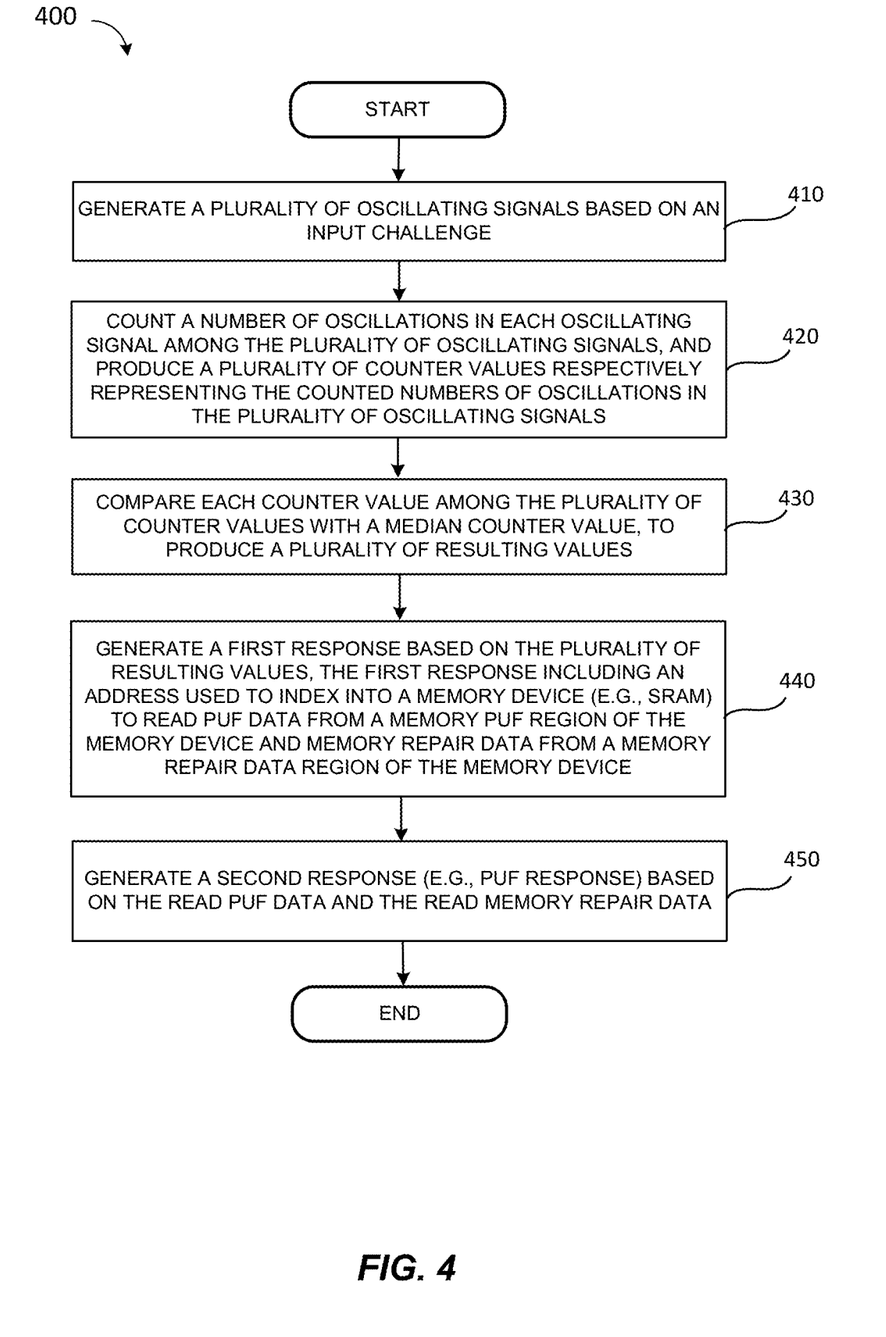
FIG. 4 is a flow diagram illustrating an example process for a PUF device according to an embodiment.

FIG. 4 is a flow diagram illustrating an example process for a PUF device according to an embodiment. Process 400 may be performed by processing logic which may be implemented using hardware (e.g. circuitry, dedicated logic, etc.), software (e.g., embodied on a non-transitory computer readable medium), or a combination of both.

Referring to FIG. 4, at block 410, the processing logic may generate a plurality of oscillating signals based on an input challenge. At block 420, the processing logic may count a number of oscillations in each oscillating signal among the plurality of oscillating signals, and produce a plurality of counter values respectively representing the counted numbers of oscillations in the plurality of oscillating signals. At block 430, the processing logic may compare each counter value among the plurality of counter values with a median counter value, to produce a plurality of resulting values. At block 440, the processing logic may generate a first response based on the plurality of resulting values. The first response may include an address used to index into a memory device (e.g., SRAM) to read PUF data from a memory PUF region of the memory device and memory repair data from a memory repair data region of the memory device. At block 450, the processing logic may generate a second response (e.g., PUF response) based on the read PUF data and the read memory repair data.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112(f) or 35 U.S.C. 112, sixth paragraph, for that unit/circuit/component.

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A physical unclonable function (PUF) device, comprising:
    a plurality of ring oscillators, each ring oscillator being configured to generate an oscillating signal based on an input challenge;

a plurality of counters, each counter being configured to count a number of oscillations in an oscillating signal generated by a corresponding ring oscillator among the plurality of ring oscillators, and produce a counter value representing the counted number of oscillations;

a plurality of comparators, each comparator being configured to compare a counter value produced by a corresponding counter among the plurality of counters with a median counter value, and produce a resulting value;

a response generator configured to generate a first response based on the resulting values produced by the plurality of comparators, the first response including an address used to index into a memory device to read PUF data from a memory PUF region of the memory device and memory repair data from a memory repair data region of the memory device; and a PUF output generator configured to generate a second response based on the read PUF data and the read memory repair data.

2. The PUF device of claim 1, further comprising a sequencer configured to sequence the plurality of ring oscillators and the plurality of counters through a series of epochs.

3. The PUF device of claim 1, further comprising a PUF input unit configured to accept the input challenge, decode the input challenge, and provide the decoded input challenge to the plurality of ring oscillators.

4. The PUF device of claim 1, further comprising a PUF calibration controller configured to generate a calibration scheme for the counter values produced by the plurality of counters relative to the median counter value.

5. The PUF device of claim 4, further comprising a plurality of arithmetic operation units configured to calibrate the counter values based on the calibration scheme, and provide calibrated counter values to the plurality of comparators.

6. The PUF device of claim 1, further comprising a queue configured to store the resulting values produced by the plurality of comparators.

7. The PUF device of claim 1, further comprising:

an error correction code memory helper function unit configured to perform a parity check and error correction on the first response, and provide the address to a first address generator and a second address generator; and a center value generator configured to select the median counter value from the counter values produced by the plurality of counters.

8. The PUF device of claim 7, further comprising:

the first address generator configured to map the address from the first response to a first address that indexes into the memory PUF region; and the second address generator configured to map the address from the first response to a second address that indexes into the memory repair data region.

9. The PUF device of claim 1, wherein the PUF output generator configured to generate the second response comprises the PUF output generator configured to concatenate, perform a finite field calculation on, or cyclic redundancy check (CRC) multiply the read PUF data and the read memory repair data.

10. A method for a physical unclonable function (PUF) device, the method comprising:

generating a plurality of oscillating signals based on an input challenge;

counting a number of oscillations in each oscillating signal among the plurality of oscillating signals, and producing a plurality of counter values respectively representing the counted numbers of oscillations in the plurality of oscillating signals;

comparing each counter value among the plurality of counter values with a median counter value, to produce a plurality of resulting values;

generating a first response based on the plurality of resulting values, the first response including an address used to index into a memory device to read PUF data from a memory PUF region of the memory device and memory repair data from a memory repair data region of the memory device; and generating a second response based on the read PUF data and the read memory repair data.

11. The method of claim 10, further comprising: sequencing the generation of the plurality of oscillating signals and the counting of the number of oscillations through a series of epochs.

12. The method of claim 10, further comprising: accepting the input challenge, decoding the input challenge, and providing the decoded input challenge to a plurality of ring oscillators.

13. The method of claim 10, further comprising: generating a calibration scheme for the plurality of counter values relative to the median counter value.

14. The method of claim 13, further comprising: calibrating the plurality of counter values based on the calibration scheme, and providing calibrated counter values to a plurality of comparators.

15. The method of claim 10, further comprising:

performing a parity check and error correction on the first response; and selecting the median counter value from the plurality of counter values.

16. The method of claim 15, further comprising:

mapping the address from the first response to a first address that indexes into the memory PUF region; and mapping the address from the first response to a second address that indexes into the memory repair data region.

17. The method of claim 10, wherein generating the second response comprises concatenating, performing a finite field calculation on, or cyclic redundancy check (CRC) multiplying the read PUF data and the read memory repair data.

18. The method of claim 10, further comprising: incorporating triple modular redundancy forward error correction to read the PUF data from the memory PUF region.

19. The method of claim 18, wherein:

generating the second response comprises generating the second response based on the read triple modular redundancy forward corrected PUF data and the read memory repair data.

20. The method of claim 10, further comprising: refreshing the memory PUF region to cause all corresponding entries to be encoded as 111 or 000.

* * * * *